Patented Mar. 4, 1924.

1,485,377

UNITED STATES PATENT OFFICE.

WILLIAM H. ENGELS, OF RAHWAY, NEW JERSEY, ASSIGNOR TO MERCK & CO., OF NEW YORK, N. Y., A CORPORATION OF NEW YORK.

ANTISPASMODIC COMPOUND AND PROCESS OF PRODUCING THE SAME.

No Drawing. Application filed April 25, 1922. Serial No. 556,424.

*To all whom it may concern:*

Be it known that I, WILLIAM H. ENGELS, a citizen of the Republic of Germany, and a resident of Rahway, in the county of Union and State of New Jersey, have invented certain new and useful Improvements in Antispasmodic Compounds and Processes of Producing the Same, of which the following is a specification.

Although benzyl sulfuric acid, benzyl phosphoric acid, benzyl succinic acid and benzyl phthalic acid have been mentioned in chemical literature as laboratory products (Beilstein II page 1050; II Erg. p. 638 and 1048; Berichte, 35, 4078), none of them has, so far as I know, received any industrial application, and particularly none in the therapeutic art.

So far as I know, in the only benzylesters which have heretofore received any industrial or therapeutic application (e. g., benzylbenzoate, benzylcinnamate, dibenzylsuccinate, benzylsalicylate and others), the acid group has been fully saturated by the benzyl group or groups, and a heretofore insurmountable obstacle to their use hypodermically has been their insolubility in water, in consequence of which their therapeutic use has been substantially limited to administration per os.

I have produced, for the first time, benzyl ester compounds of a water solubility and purity, compatible with hypodermic, intravenous and subcutaneous use, and a process by which they may be obtained, and I believe that I have thereby not merely converted certain unused substances into products of great utility, but have greatly enlarged the medicinally important field of antispasmodic remedies.

My invention also involves the discovery of the conditions under which any by-products that may be present with the unsaturated benzylester are eliminated at the same time that the ester is transformed into a water soluble condition, so that I obtain a therapeutically pure crystalline water soluble benzyl compound.

For the isolation of these valuable compounds I proceed in the following manner: First I cause inorganic or organic polybasic acids, such as phosphoric, succinic or phthalic acids, by one or the other of the methods known, (for example, those described in Liebig's Annalen vol. 262 p. 211, Berichte 35 p. 4078 and Journ. Am. Ch. S. 1921 p. 1673), to be partially saturated with benzyl alcohol, leaving at least one acid equivalent uncombined. These so formed benzylester acids, which do not necessarily have to be in a state of highest purity, I dissolve in a suitable organic solvent like alcohols or acetone, neutralize with alkali hydroxide or carbonate, and cause the separation of the pure salts from their mother liquor either by crystallization upon cooling, or by precipitation with another solvent like ether, benzol, gasoline, etc., in which these salts generally are insoluble. The dry salts are then isolated in the customary way.

To illustrate my invention I will now give a few examples in detail:

*Example 1—Sodium dibenzylphosphate.*—1 kilogram dibenzylphosphoric acid is dissolved in 5 litres acetone, then neutralized while heating, for example to a refluxing temperature, with anhydrous sodium carbonate, of which about 0.2 kilogram are needed, and filtered. The pure sodium dibenzylphosphate crystallizes out on cooling. Additional amounts of the product may be obtained on concentrating the mother liquor or upon adding anhydrous ether.

*Example 2—Sodium benzylsuccinate.*—1 kilogram succinic acid monobenzylester is dissolved in 4 litres alcohol (92–95%), heated to about 80°, neutralized with anhydrous sodium carbonate and filtered hot. On cooling, the sodium monobenzylsuccinate crystallizes out and may be recovered from the mother liquor in the customary way.

*Example 3—Sodium benzylphthalate.*—1 kilogram of phthalic acid monobenzylester is dissolved in 7 litres 70% alcohol and neutralized with the required amount of sodium hydroxide or carbonate, applying heat to the mixture at the same time. The white sodium salt separates out as a bulky mass upon cooling.

It will be observed that in the first two of the above examples, the formation of the salt is accomplished under anhydrous conditions. This is to enable this step to accomplish the dual function of producing therapeutic purity as well as water solubility, the by-products, if any, present with the ester being retained in the acetone or alcohol solvent. In the third example, the formation of the salt may be said to be under approximately anhydrous conditions, because the water present in the 70% alcohol is only sufficient to enable the by-products to be retained in the solvent, such by-products in this instance being more or less insoluble in alcohol alone.

In the foregoing I have described my invention as applied to phosphoric, succinic, and phthalic acids, these being preferred, but I believe that it may be applied to other polybasic acids such, for example, as sulfuric, malonic, tartaric and citric acids, and I understand that these are to be considered as equivalents.

I also understand that other alkali hydroxides or carbonates may be substituted for the sodium hydroxide or carbonate, such, for example, as ammonium, potassium or lithium.

What I claim and desire to secure by Letters Patent of the United States is:—

1. As an article of manufacture, a polybasic acid saturated in part by an alkali and in part by the benzyl group, and therapeutically pure.

2. As an antispasmodic adapted for hypodermic injection, therapeutically pure sodium dibenzylphosphate soluble in water.

3. The process of making an alkali dibenzylphosphate, which consists in treating phosphoric acid dibenzylester with an alkali base under approximately anhydrous conditions, and isolating the salt.

4. The process of simultaneously purifying and rendering water soluble a polybasic acid partially saturated by a benzyl group, which consists in completing the saturation by combination with an alkali under approximately anhydrous conditions.

In testimony whereof I have hereunto signed my name in the presence of two subscribing witnesses.

WILLIAM H. ENGELS.

Witnesses:
F. W. HENDERSHOTT,
R. G. GRUBER.